(12) United States Patent
Raz et al.

(10) Patent No.: US 9,648,698 B2
(45) Date of Patent: May 9, 2017

(54) METHOD AND SYSTEM FOR GENERATING LIGHT PATTERN USING POLYGONS

(71) Applicant: Facebook, Inc., Menlo Park, CA (US)

(72) Inventors: Guy Raz, Binyamina (IL); Yair Alpern, Tivon (IL); Nadav Grossinger, Karmei Yosef (IL)

(73) Assignee: Facebook, Inc., Menlo Park, CA (US)

( * ) Notice: Subject to any disclaimer, the term of this patent is extended or adjusted under 35 U.S.C. 154(b) by 129 days.

(21) Appl. No.: 14/716,888

(22) Filed: May 20, 2015

(65) Prior Publication Data
US 2016/0341399 A1 Nov. 24, 2016

(51) Int. Cl.
  *G02B 26/08* (2006.01)
  *H05B 37/02* (2006.01)
  *G01B 11/25* (2006.01)
  *H04N 9/00* (2006.01)
(52) U.S. Cl.
  CPC ..... *H05B 37/0209* (2013.01); *G01B 11/2513* (2013.01); *H04N 9/00* (2013.01)
(58) Field of Classification Search
  CPC .. G02B 26/124; G02B 26/125; G02B 26/127; G02B 26/0833; G02B 5/189; G02B 27/0031; G02B 27/0037; G02B 27/4227; G02B 27/4283
  USPC .......................................... 359/198.1–226.1
  See application file for complete search history.

(56) References Cited

U.S. PATENT DOCUMENTS

| | | | |
|---|---|---|---|
| 4,537,465 A * | 8/1985 | Sherman | G02B 26/129 359/203.1 |
| 4,560,862 A | 12/1985 | Eastman et al. | |
| 5,557,438 A | 9/1996 | Schwartz et al. | |
| 6,292,285 B1 | 9/2001 | Wang et al. | |
| 8,027,076 B2 * | 9/2011 | Shiraishi | G02B 26/12 359/216.1 |
| 2001/0009470 A1 * | 7/2001 | Kamikubo | G02B 26/125 359/205.1 |
| 2005/0046823 A1 | 3/2005 | Ando et al. | |
| 2010/0020377 A1 | 1/2010 | Borchers et al. | |

(Continued)

FOREIGN PATENT DOCUMENTS

EP 0 721 126 A1 7/1996
EP 1335234 B1 6/2011
(Continued)

OTHER PUBLICATIONS

PCT International Search Report and Written Opinion, PCT Application No. PCT/US2016/030421, Aug. 10, 2016, 15 pages.
(Continued)

*Primary Examiner* — Euncha Cherry
(74) *Attorney, Agent, or Firm* — Fenwick & West LLP

(57) ABSTRACT

A method and system for generating light pattern using reflective polygons are provided herein. The method may include: rotating at least one polygon having a plurality of reflective facets along a rotation axis parallel to the facets; transmitting a light beam on the facets of the polygon; tilting the light beam relative to the polygon in parallel to the rotation axis so that the light beam hits each of the facets at a different tilt angle, thereby producing a light pattern comprising a plurality of lines; and controlling at least one of: the light intensity, the rotating, and the tilting, so as to produce an adjustable light pattern transmitted at a scene.

19 Claims, 8 Drawing Sheets

(56) References Cited

U.S. PATENT DOCUMENTS

| 2011/0298695 | A1  | 12/2011 | Hajjar et al. |
| 2012/0188614 | A1  | 7/2012  | Azegrouz |
| 2012/0194561 | A1  | 8/2012  | Grossinger et al. |
| 2013/0038671 | A1* | 2/2013  | Yoshida ................ B41J 2/473 347/118 |
| 2014/0240827 | A1  | 8/2014  | Asai et al. |

FOREIGN PATENT DOCUMENTS

| GB | 2 494 985 A     | 3/2013 |
| JP | H11-194018 A    | 7/1999 |
| WO | WO 01/71426 A2  | 9/2001 |
| WO | WO 2014/014838 A2 | 1/2014 |
| WO | WO 2015/059705  | 4/2015 |

OTHER PUBLICATIONS

European Patent Office, Search Report and Opinion, European Patent Application No. 16170260.0, Jan. 4, 2017, fifteen pages.

\* cited by examiner

METHOD AND SYSTEM FOR GENERATING LIGHT PATTERN USING POLYGONS

TECHNICAL FIELD

The present invention relates generally to structured light and more particularly, to generating a light pattern using polygons.

BACKGROUND OF THE INVENTION

Prior to the background of the invention being set forth, it may be helpful to set forth definitions of certain terms that will be used hereinafter.

The term 'structured light' as used herein is defined as the process of projecting a pattern of light on to a scene. The pattern is projected by a 'transmitter' which includes an illuminator which creates a light beam and optics which converts the light beam into the pattern. The way that this pattern deforms when striking surfaces allows vision systems to calculate the depth and surface information of the scene and the objects in the scene. The pattern is being captured and analyzed by a so-called 'receiver' which includes a sensor (or a capturing device) and a computer processor for analyzing the captured reflected pattern.

Invisible structured light may be used without interfering with other computer vision tasks for which the projected pattern will be confusing, by typically using infra-red light IR.

Structured light has many applications. One such application can be the identifying and the tracking of real objects in a scene as explained in further details in US Patent Publication No. US 2012/0194561 titled "Remote control of computer devices" and in WIPO Publication No. WO 2015/059705 titled: "Three dimensional depth mapping using dynamic structured light" both of which are incorporated herein by reference in their entirety.

The term 'depth map' as used herein is defined as an image that contains information relating to the distance of the surfaces of scene or objects in the scene from a viewpoint. The computer processor of the receiver generates the depth map using prior knowledge of the light pattern. Specifically, the analysis of the reflections coming from the scene is based on a triangulation process in which the location of every point of the pattern is derived based on the relative location and orientation of the transmitter and the sensor.

One of challenges of using structured light 3D sensing is how to overcome ambient light which contributes to the noise level of the sensor. The problem with ambient light is that when it is at a high level, the signal to ambient ratio becomes low and leads to poor performances. As one example, the sensor noise is typically related to the overall illumination. A strong ambient light will therefore increase the system noise and reduce the signal to noise ratio.

As another example, the sensor's spatial non-uniformity is typically also related to the illumination level. Ambient light will therefore increase the non-uniformity while not contributing to the signal level. The ambient light (or background illumination) eventually affects the range and field of view (FOV)—the area covered by the pattern—per unit power of the system. This is because it is necessary to keep the structured light pattern at a certain level of brightness above the background.

Currently, all familiar structured light techniques use a staring camera as a sensor for the receiver. As such, the camera allows all the ambient light to enter throughout the full integration time which is related to the frame time of the camera (the time a single frame is being captured). In a staring camera system, the only way to reduce the ambient light coming into the sensor is to use a shorter exposure time. This, however, requires operating the laser (the illuminator) in high power short pulses which increase complexity and reduces laser reliability. Using short pulses may also be limited by eye safety issues.

SUMMARY OF THE INVENTION

According to some embodiments of the present invention, a method and a system for generating light pattern using reflective polygons which are further rotating along their longitudinal axis are provided herein. The method may include: rotating at least one polygon having a plurality of reflective facets along a rotation axis parallel to the facets; transmitting a light beam onto the facets of the polygon; splitting the light beam in parallel to the rotation axis so that each light beam hits each of the facets at a different tilt angle, thereby producing a light pattern comprising a plurality of lines; controlling at least one of: the light intensity, the rotating speed, and the tilting, so as to produce an adjustable light pattern transmitted at a scene; sensing the reflections of the pattern from the scene, as it is being produced (e.g., non-staring camera); and producing a depth map of the scene by analyzing the signals coming from the sensor.

These, additional, and/or other aspects and/or advantages of the embodiments of the present invention are set forth in the detailed description which follows; possibly inferable from the detailed description; and/or learnable by practice of the embodiments of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION OF THE INVENTION

Figure 1A:
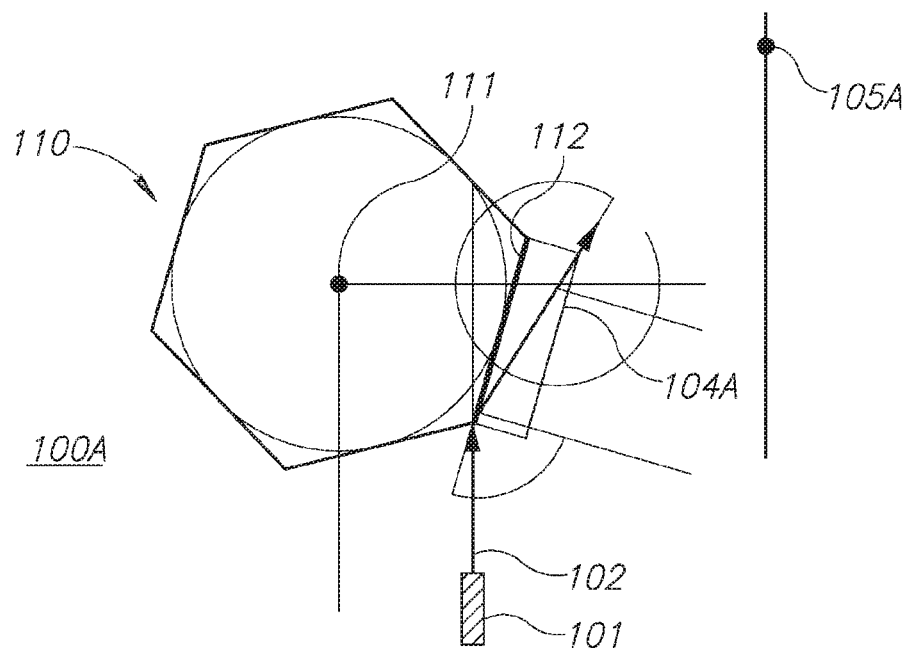
FIGS. 1A, 1B, and 1C are cross section diagrams showing a polygon and a light beam reflected from one of its surfaces in various stages of rotation according to embodiments of the present invention.

With specific reference now to the drawings in detail, it is stressed that the particulars shown are by way of example and for purposes of illustrative discussion of the preferred embodiments of the present technique only, and are presented in the cause of providing what is believed to be the most useful and readily understood description of the principles and conceptual aspects of the present technique. In this regard, no attempt is made to show structural details of the present technique in more detail than is necessary for a fundamental understanding of the present technique, the description taken with the drawings making apparent to those skilled in the art how the several forms of the invention may be embodied in practice.

Before explaining at least one embodiment of the present technique in detail, it is to be understood that the invention is not limited in its application to the details of construction and the arrangement of the components set forth in the following description or illustrated in the drawings. The present technique is applicable to other embodiments or of being practiced or carried out in various ways. Also, it is to be understood that the phraseology and terminology employed herein is for the purpose of description and should not be regarded as limiting.

Figure 1B:
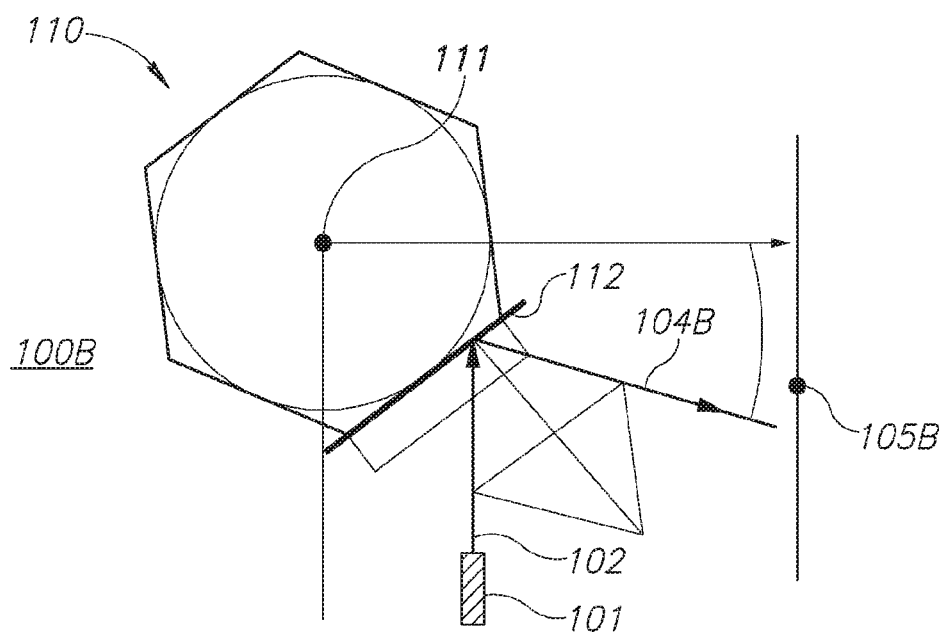
Figure 1C:
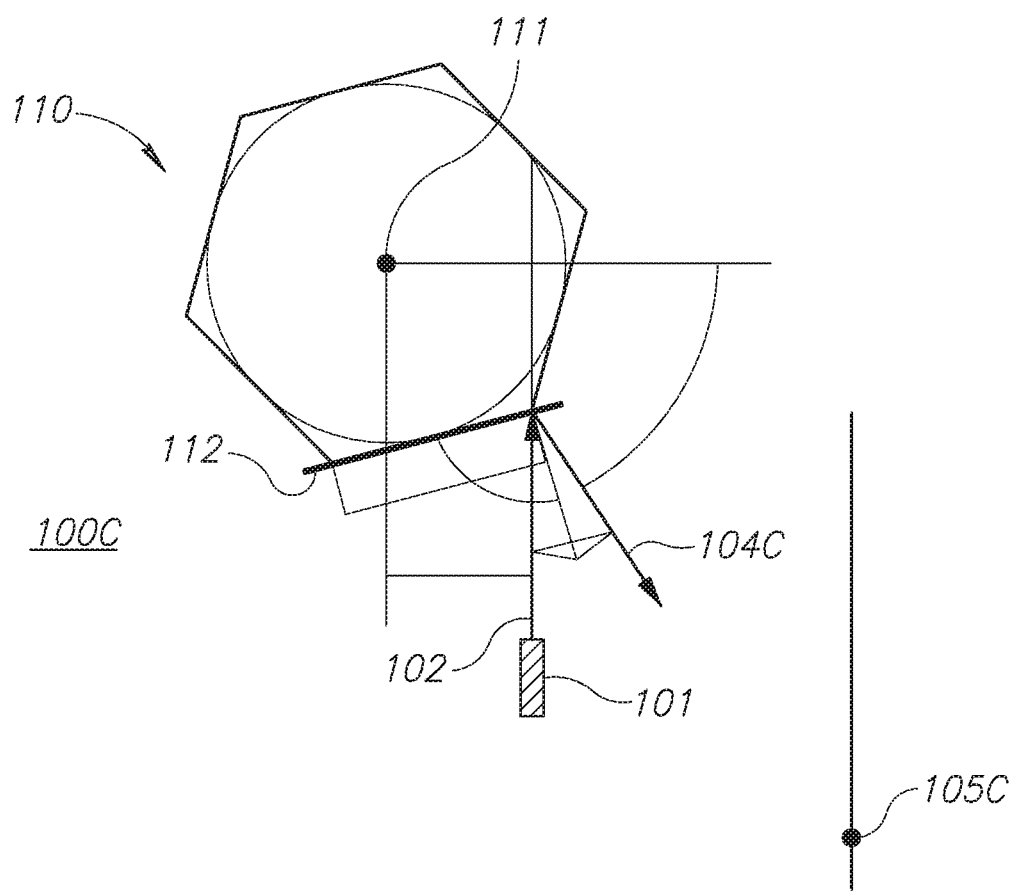

FIGS. 1A, 1B, and 1C show several cross-section diagrams 100A, 100B, and 100C, each illustrating the same polygon 110 at various stages of rotation along its axis 111.

A light beam 102 is transmitted by an illuminator 101 (such as a collimated laser) towards facet 112 of polygon 110 and reflected therefrom onto reflected light beam at various angles 104A, 104B, and 104C, based on the progress in the rotation of the polygon. The reflected light beam forms a respective light pattern on a surface in the scene. Thus, reflected light beams 104A, 104B, and 104C form light patterns portions 105A, 105B, and 105C respectively. It is clear that a continuous rotation of polygon 110 generates a line pattern for beam 104. It should be noted that by way of a non-limiting example only, the polygon illustrated herein is a hexagon. It is understood that embodiments of the present invention may use any other kind of polygon.

As polygon 110 is rotating the reflected beam 104 scans a large angular field of view repeatedly. The scanned angle is related to the polygon inner angle by Eq. (1) below:

$$\Omega = 360° - 2 \times \theta \quad (1)$$

When reflecting a single collimated beam, a single line is drawn horizontally across the field of view. The line is redrawn with each facet of the polygon. Those by rotating the polygon at R rotations per second, the line will be drawn repeatedly R*n times every second with n being the number of facets in the polygon (n=6 for hexagon).

Advantageously, embodiments of the present invention may use a standard simple constant wave (CW) laser to create effective large field of view coverage with excellent signal to background ratio. The pattern will also be very horizontally uniform and will be easily built with simple optical components.

Figure 2:
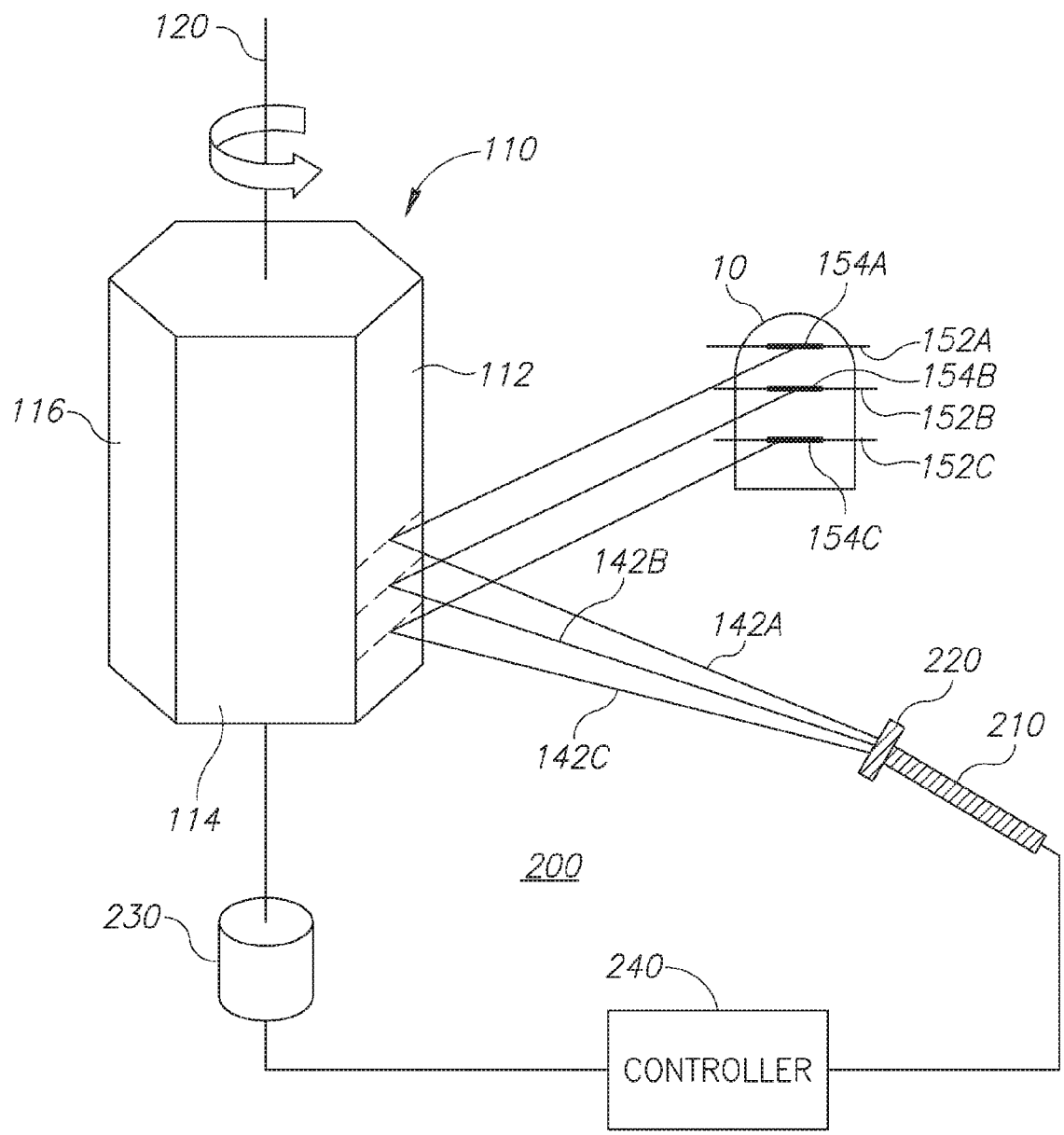
FIG. 2 is a diagram illustrating several aspects of a transmitter in accordance with some embodiments of the present invention.

FIG. 2 is a diagram illustrating an adjustable light pattern transmitter in accordance with one embodiment of the present invention. System 200 may include a polygon 110 having a plurality of reflective facets such as 112, 114, and 116 and a rotation axis 120 parallel to the facets. System 200 may further include a light source 210 such as a collimated IR laser, configured to transmit one or more light beams 142A, 142B, and 142C onto the facets of the polygon. In one embodiment, the beam is split into several beams by a diffractive optical element (DOE) 220 coupled to light source 210.

System 200 may further include at least one driver 230 configured to rotate the polygon along the rotation axis. Driver 230 may be controlled by controller 240 which may determine the rotation speed of polygon 110 and also light properties (such as laser intensity) of light source 210.

In operation, each of light beams 142A, 142B, and 142C is transmitted onto the facets of the polygon which in turn reflect them onto the scene, and possibly over an object 10 on which they each form, due to the scanning nature of the polygon, line patterns 152A, 152B, and 152C respectively. Each line is being repeatedly drawn with for each facet of the polygon. Thus, the number of facets as well as the rotation speed of the polygon affects the refresh rate of the light pattern generated by light source 210.

According to some embodiments of the present invention, the laser power of the light source 210 can be modulated, possibly by controller 240 throughout the rotation in order to create variable horizontal intensity across the field of view. More specifically, the adjusting may be carried out on a predefined region of interest (ROI) of the scene, wherein the light pattern of the ROI exhibits a different light intensity than other parts of the light pattern. For example, portions 154A, 154B, and 154C of lines 152A, 152B, and 152C exhibit a higher intensity of the laser. This is useful, for example, if the system is monitoring areas with different levels of background, or reflectivity, in which different intensities can compensate environmental conditions. Examples of systems and methods where the aforementioned feature is required may be found in US Patent Publication No. US 2012/0194561, which is incorporated herein by reference in its entirety.

Figure 3A:
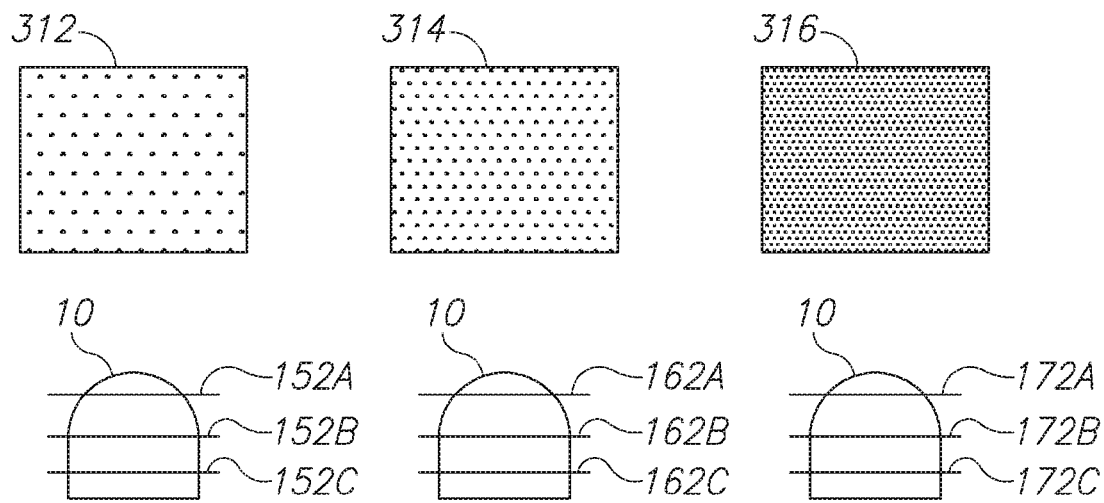
FIG. 3A is a diagram illustrating different facets of a polygon and resulting patterns in accordance with some embodiments of the present invention.

FIG. 3A is a diagram illustrating different facets 312, 314, and 316 of a polygon (in this example n=3) and resulting patterns on object 10, namely the set of lines 152A-152C, 162A-152C, and 172A-152C respectively. In accordance with this embodiment, some of the facets are designed to have different optical properties than other facet. As one example, alternating facets can shift the horizontal line pattern slightly up and down, thus creating an interlaced coverage of the scene. As another example, alternating facets can change the lines intensity, thus decoding a temporal unique code that will allows line identification. In some cases, each facet has its unique optical properties. As a result, the corresponding light pattern reflected from the facet has further optical properties linking it to the respective facet. This renders the different patterns optically distinguishable. This may serve as means for indexing or modulating the patterns as sometimes required in structured light embodiments that are using patterns. Such patented light applications may be used in depth mapping and, more particularly, but not exclusively, to a method of depth mapping using optical projections into a volume, and may be useful, for example to provide a user skeleton model, or a user interface for controlling a device, or for a user interface with a computer, or for a user interface to a virtual reality system or for anything else where body movements and gestures or for that matter object movements, are to be tracked by a machine.

Following are several exemplary embodiments for usage of patterned light using patterned light to obtain a depth map in a volume, which in turn may be used to identify an object such as a hand and/or a movement of the object and enable the identification of postures or gestures.

The present embodiment projects structured light, a light pattern, into a volume. The structure that is detected is a distorted version of the original structure, which contains shifts and other distortions due to depth, and comparison to the original structure, or simple identification of parts of the pattern, can be used to identify the shifts or distortions and generate a depth map. That is to say the depth map may be obtained from a best correlation as discussed below.

The correlation may be obtained using a sequence of adjusted features, in that features included in the light pattern may be individualized to aid with correlation between the detected pattern and the reference pattern.

The correlation is for the structure or pattern overall, based on individual features, or is for individual features and for parts of the pattern, as will be discussed hereinbelow. The correlation is based on the detected image from the volume and allows depths to be correlated with objects in the volume.

In one embodiment, one or more different variations to the light pattern in orthogonal directions may be provided to allow for unambiguous identification of specific light features for depth mapping. The variations may be intensity variations and may give unique signatures to each part of the light features. Alternatively, the variations may be cyclic but not in phase to provide maximal unique identification for minimal computing resources. Furthermore, in the case of two or more variations, two different variations can be measured against each other to give depths at different positions.

In one embodiment, given solely as an example, the features include stripes in one dimension. A unique or cyclically unique signature is applied to each stripe in a first dimension for example in the Y axis. The depth map may be provided based on the shifting of each stripe from base position. In order to exactly obtain the shifting, each line has to be individually identified, and the identification is achieved on the basis of the unique signature.

It is stressed that the use of stripes is simply an example of a possible intensity feature that may be used. Squares of differing intensity could also be used for example.

In the case of stripes and an intensity variation, the detected stripes may be weak, strong, or medium. The pattern may have a single location where weak, strong, medium coincide in the given order, and in that case, the indexing is obtained.

An embodiment may use two intensity variations. The two intensity variations may be cyclical, for example based on available gray levels that can be set for individual pixels, thus considerably saving on electronics and optics. As long as the two cyclical variations are out of phase then an overall cycle which is relatively large can be provided.

An embodiment supplements the depth map calculation based on stripe shifting as above by further calculating a ratio between hotspot intensity and line intensity, as will be explained in greater detail below.

Thus, the at least two variations can also be used to provide absolute indexing of the pattern. The pattern itself may be made up of parallel stripes. The stripes may vary in their base intensity for example in a cycle to give a variation in a first direction such as a direction orthogonal to the stripes. The stripes themselves may carry notations in their lengthwise direction, the variations being arranged differently on different stripes so that each stripe or cluster of stripes can be identified and indexed. The notations may in one embodiment have a peak intensity that is kept constant. All intensities appear to dim with increasing distance of the object from the light source and detector and decreased detected intensity of the stripes can always provide a depth indicator, although absolute brightness also depends on the reflecting surface and thus cannot be relied upon alone. However, using a ratio between the stripe base intensity and the peak intensity may allow for more accurate depth calculation, especially when combined with segmentation or triangulation results.

Furthermore, the different intensities and different notation distributions on each stripe allow the individual stripe and sector of the stripe to be identified and thus allow for more accurate depth mapping.

The notations may be constructed from Gaussian brightness distributions for ease of use, although this is not essential.

In the present embodiments, a light pattern is projected having one, two or more distinctive intensity variations. Each variation has a unique intensity alternation function throughout space. For example, the pattern can consist of having continuous stripes with Gaussian shaped intensity hotspots along the stripe. While the stripe intensity degrades linearly while moving in the Z direction, the intensity measured by the camera at the peak of each hot spot remains constant. The distance to an object that reflects the light pattern back to the camera can be extracted by a comparison of the hotspot intensity to the stripe intensity around it.

Figure 3B:
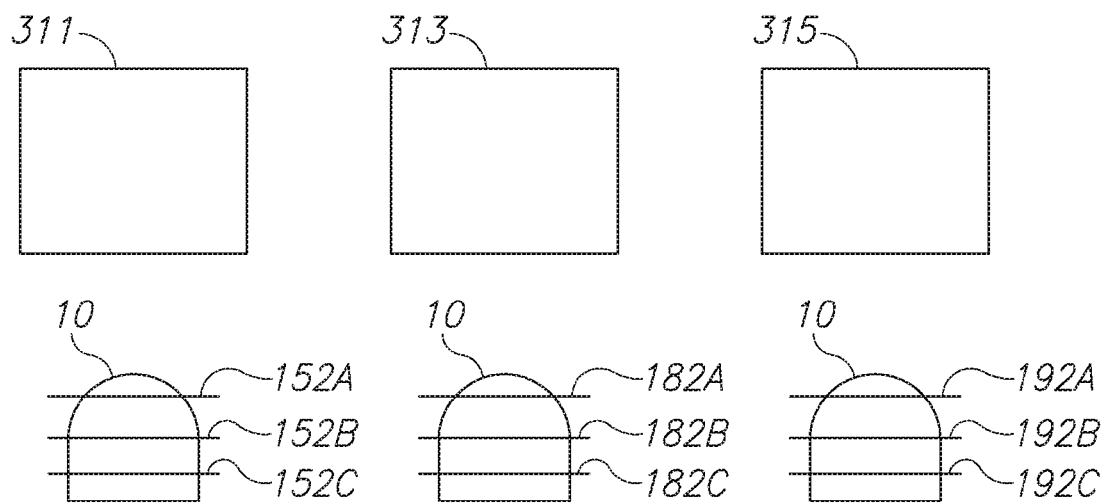
FIG. 3B is a diagram illustrating different tilt angles for the facets of a polygon and resulting patterns in accordance with some embodiments of the present invention.

FIG. 3B is a diagram illustrating facets 311, 313, and 315 each having a small shift in tilt angle (for example ½ the angular separation between lines or some similar natural factor) and resulting patterns being line sets 152A-152C, 182A-182C, and 192A-192C projected onto object 10 in accordance with some embodiments of the present invention. In this embodiment, the different tilt angle of the facets results in a displacement of the patterns for each frame. This may be used to achieve super-resolution and also for indexing purposes.

Figure 4A:
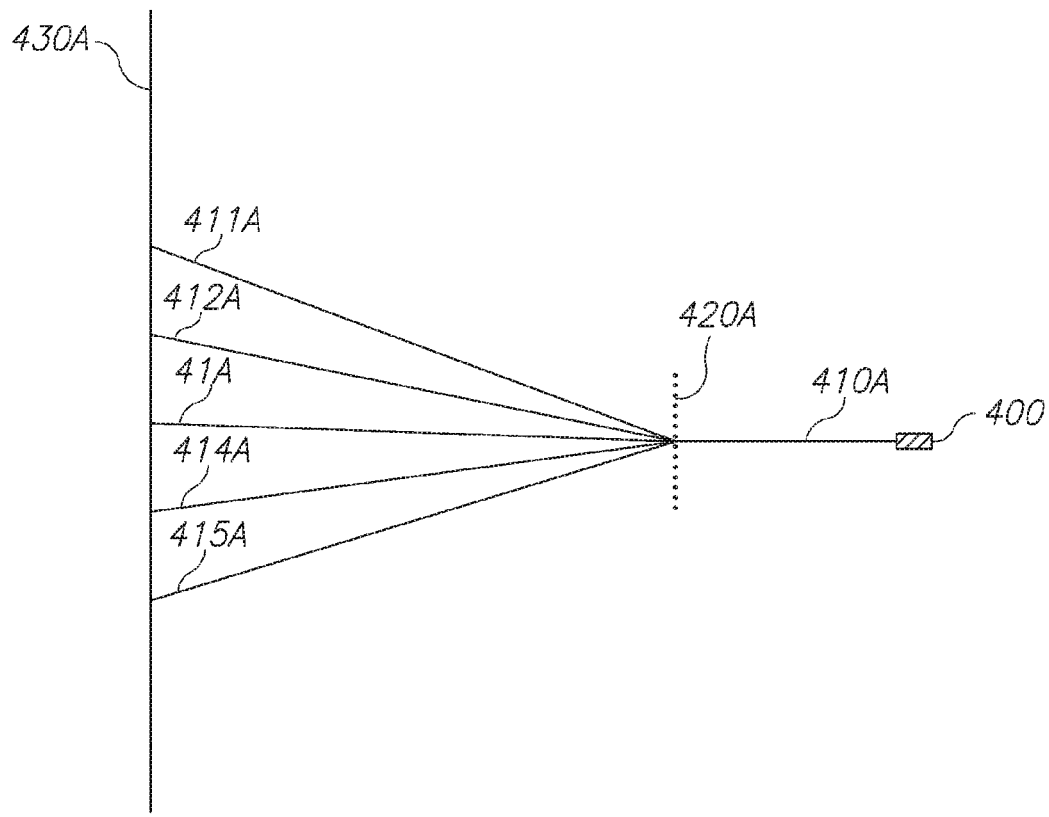
FIG. 4A is a diagram illustrating light beam splitting in accordance with some embodiments of the present invention.

FIG. 4A is a diagram illustrating light beam splitting in accordance with some embodiments of the present invention. Collimated laser source 400 transmits a light beam 410A into a diffractive optical element (DOE) 420A which cause interferences which results in a spatial split of the laser energy into a plurality of beams 411A-415A prior to being reflected from facet 430A of the polygon. In some embodiments, when an even spacing between the lines of the light pattern are required, DOE 420A may be designed so that the plurality of beams 411A-415A result in evenly spaced lines, once the polygon rotates.

Figure 4B:
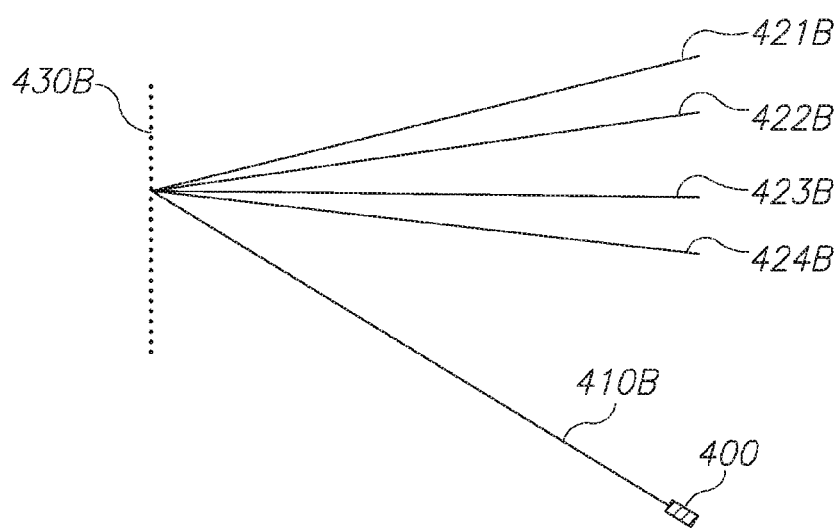
FIG. 4B is a diagram illustrating light beam splitting in accordance with other embodiments of the present invention.

FIG. 4B is a diagram illustrating light beam splitting in accordance with other embodiments of the present invention. Collimated laser source 400 transmits a light beam 410B into a facet 430B of a polygon, facet 430 exhibit diffractive optical layer which splits and reflect light beam 410B into a plurality of light beam 421B-424B which are used to create the light pattern.

Figure 5:
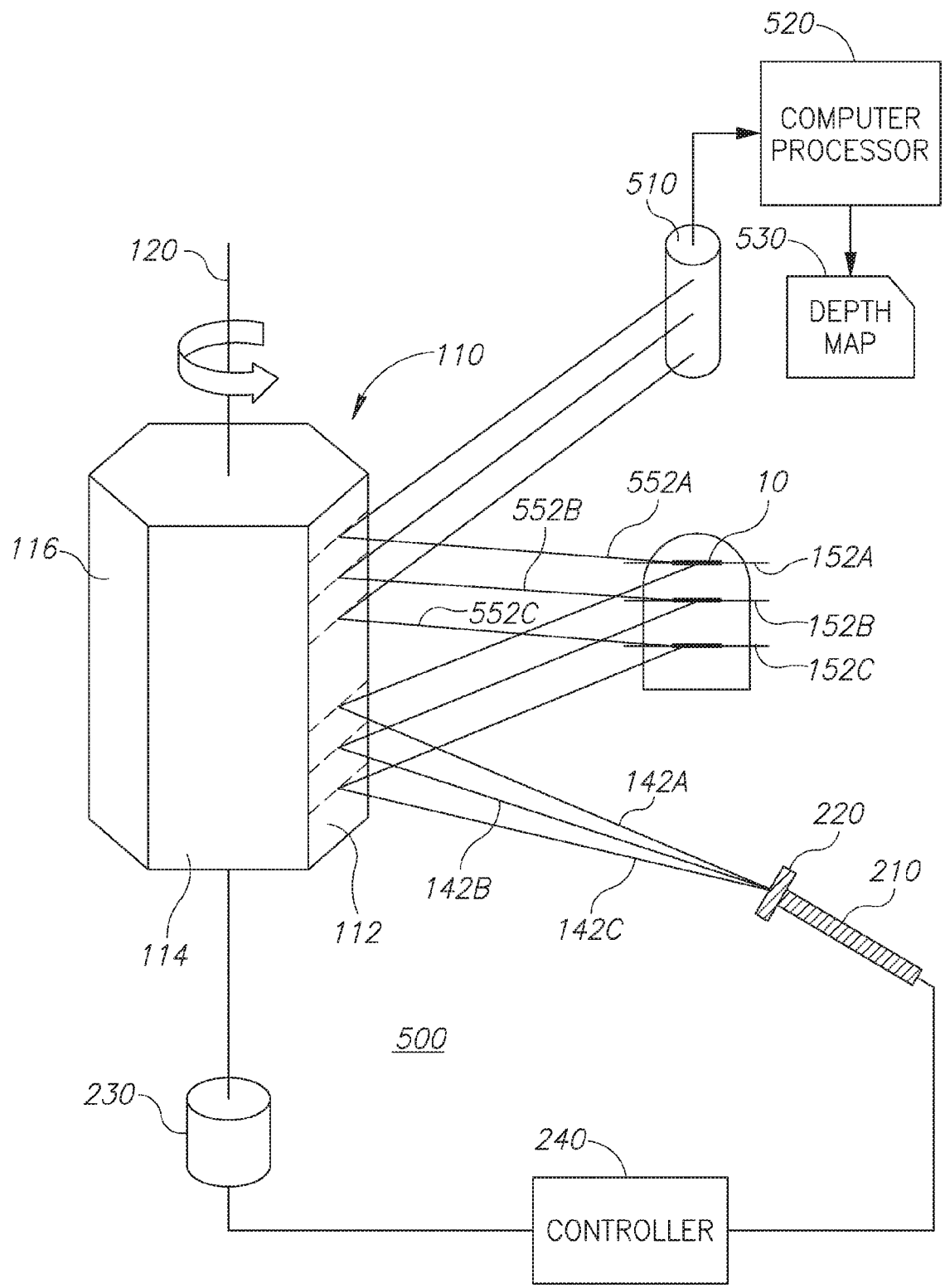
FIG. 5 is a diagram illustrating a system configuration which includes a single polygon and a single sensor in accordance with some embodiments of the present invention.

FIG. 5 is a diagram illustrating a system 500 in accordance with some embodiments of the present invention. System 500 present all elements of aforementioned system 200 but further includes a sensor 510 configured to sense reflections 552A, 552B and 552C of the light pattern reflected from the scene (e.g. object 10) and transmitted back by the facets. Specifically, sensor 510 is spatially located so that sensor 510 and light source 210 form a triangulation pair over a vertical stereoscopic base. System 500 may further include a computer processor 520 configured to receive the data relating to the transmitted light pattern and to the corresponding reflections so as to produce a depth map 530 of the scene. According to some embodiments of the present invention sensor 510 is a line sensor positioned in parallel to the rotation axis of the at least one polygon. The use of a line sensor is possible since at every point of time, a different vertical line of pixel is being scanned.

Figure 6:
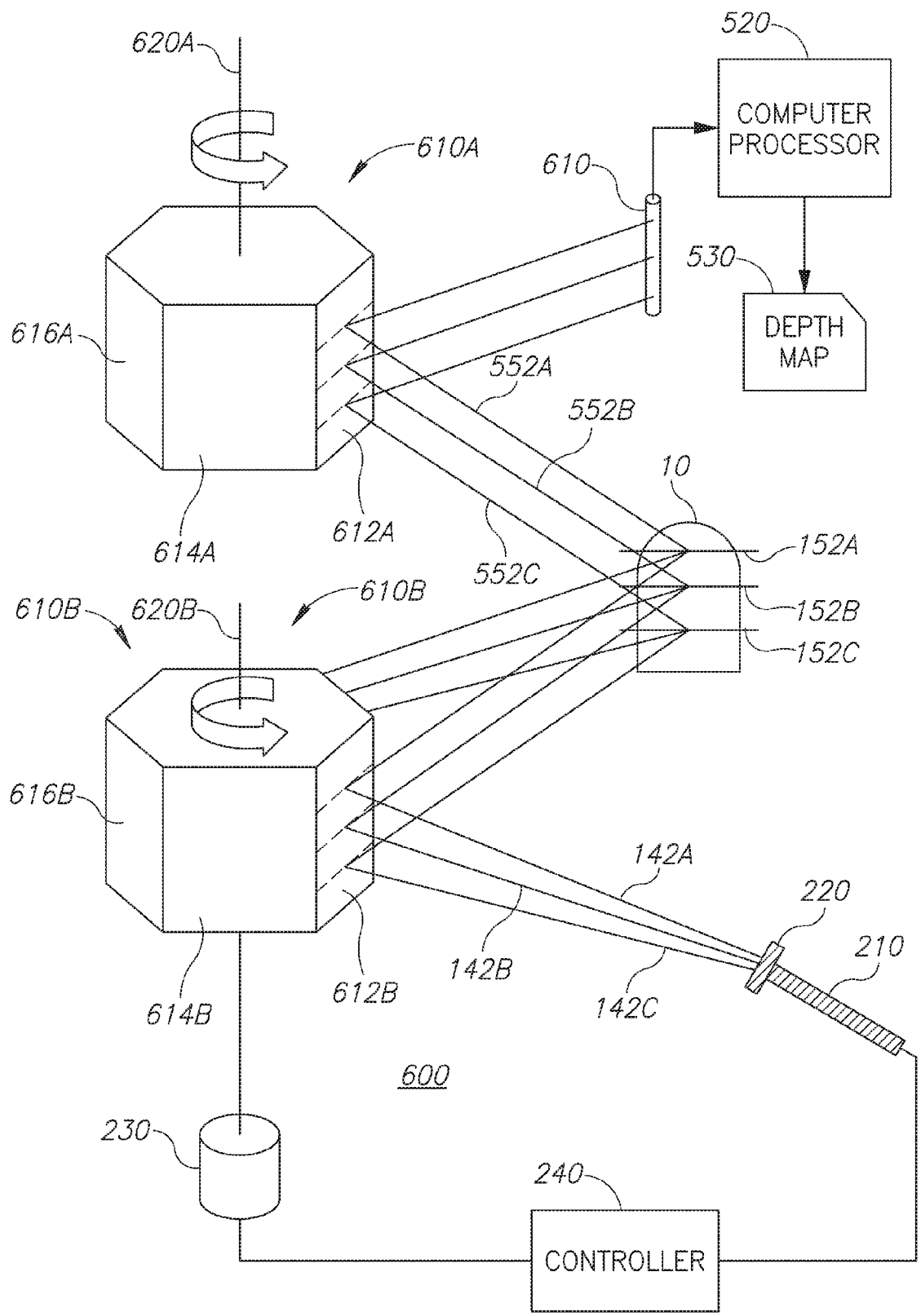
FIG. 6 is a diagram illustrating a system configuration which includes two polygons and a single sensor in accordance with some embodiments of the present invention.

FIG. 6 is a diagram illustrating a system 600 in accordance with another embodiment of the present invention. System 600 includes all the elements of aforementioned system 500 with one difference: instead of a single large polygon, system 600 includes a first polygon 610B positioned so as to receive the light beam from the light source 210, and a second polygon 610A having a same rotation axis as the first polygon and further positioned so as to transmit the reflections of the light beam coming from the scene, to the sensor 610 (here illustrated by way of example as a line sensor). This embodiment has some benefits when a more compact solution is required, typically when the height of the single polygon becomes too high. For a proper operation of system 600 it may be required to synchronize the rotation of first polygon 610B and second polygon 610B.

Figure 7:
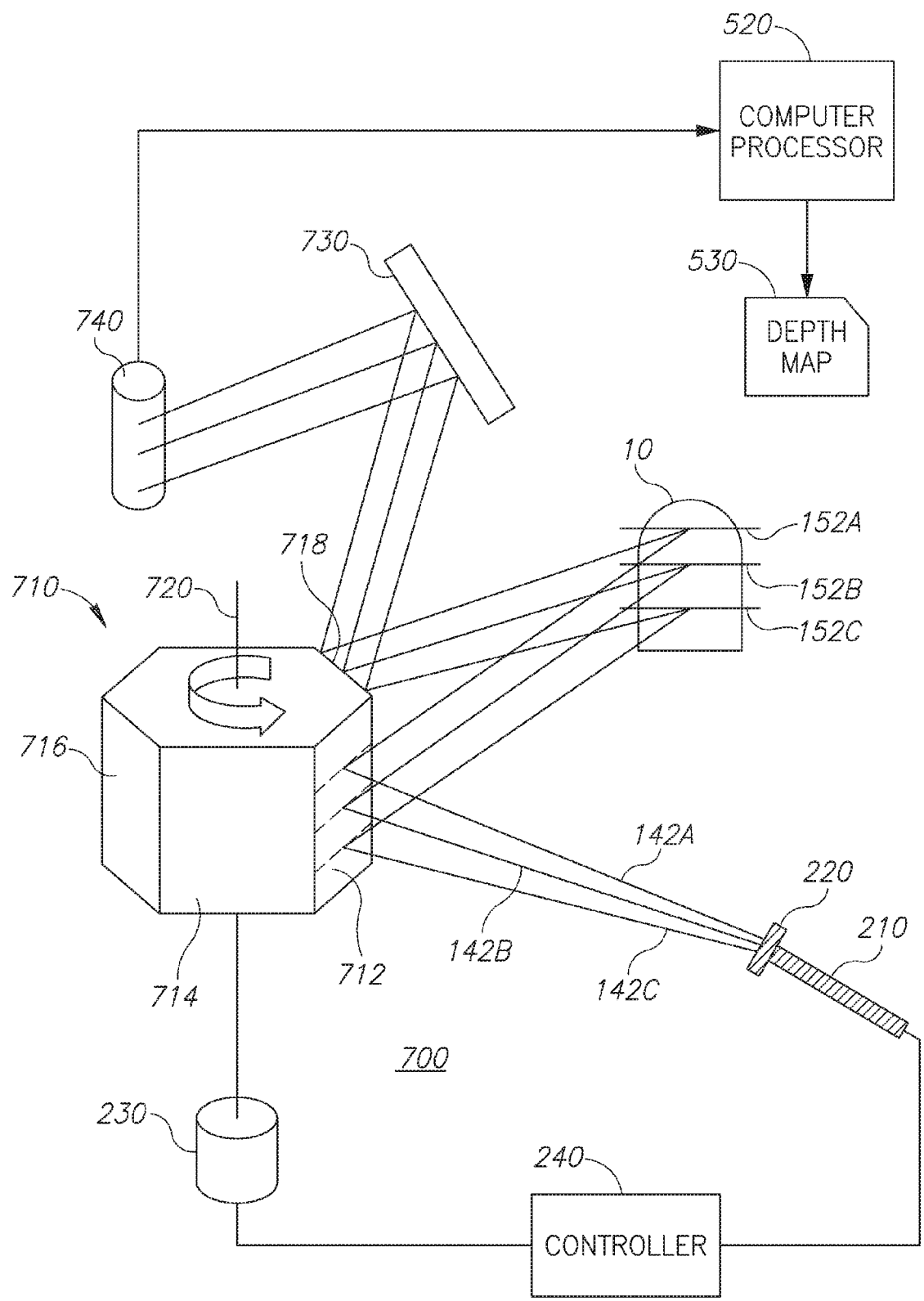
FIG. 7 is a diagram illustrating a system configuration which includes a single polygon and a single sensor and optics located along an optical path between them, in accordance with some embodiments of the present invention.

FIG. 7 is a diagram illustrating a system in accordance with yet another embodiment of the present invention. System 700 includes all the elements of aforementioned system 500 with one difference: system 700 further includes a plurality of optics such as mirror 730 (but can also include lenses) positioned between the sensor 740 and the at least one polygon 710 configured to transmit the reflections coming from the facet, at a point substantially on same line perpendicular to the rotation axis, as the point at which the light beam is directed.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A system comprising:
    at least one reflective column with a polygonal cross section having a plurality of facets and at least one rotation axis parallel to the facets;
    a light source configured to transmit a light beam on the facets of the reflective column;
    at least one driver configured to rotate the at least one reflective column along the at least one rotation axis; and
    a controller configured to control at least one of the light source and the at least one driver to produce an adjustable light pattern transmitted at a scene; and
    a sensor configured to sense reflections of the light pattern reflected from the scene and then transmitted back to the sensor by at least one facet of the at least one reflective column.

2. The system of claim 1, wherein the light beam comprises multiple beams.

3. The system of claim 2, further comprising a diffractive optical element, wherein the multiple beams are generated using the diffractive optical element.

4. The system of claim 3, wherein the diffractive optical element is part of a facet of the plurality of facets.

5. The system of claim 1, wherein one or more facets of the plurality of facets have optical properties different from other facets of the plurality of facets, so that a pattern produced via the one or more facets is optically distinguishable from patterns produced via the other facets.

6. The system of claim 1, wherein each of the facets has different optical properties.

7. The system of claim 1, wherein the controller controls the light source by adjusting an intensity of the light beam.

8. The system of claim 1, wherein the light pattern is adjusted based on a predefined region of interest (ROI) of the scene, wherein a part of the light pattern associated with the ROI exhibits a different light intensity than other parts of the light pattern.

9. The system of claim 1, further comprising a computer processor configured to receive data relating to the transmitted light pattern and to the light pattern reflected from the scene, wherein the computer processor is further configured to produce a depth map of the scene based on the received data.

10. The system of claim 1, wherein the sensor is a line sensor positioned in parallel to the at least one rotation axis of the at least one reflective column.

11. The system of claim 1, wherein the at least one reflective column comprises a first reflective column positioned to receive the light beam from the light source, and a second reflective column having a same rotation axis as the first reflective column and further positioned to transmit the reflections of the light pattern coming from the scene to the sensor.

12. The system of claim 1, further comprising a plurality of optics positioned between the sensor and the at least one reflective column configured to transmit the reflections coming from the at least one facet, at a point substantially on same line perpendicular to the at least one rotation axis, as the point at which the light beam is directed.

13. A method comprising:
rotating at least one reflective column with a polygonal cross section having a plurality of facets along at least one rotation axis parallel to the facets;
transmitting a light beam on the facets of the reflective column;
controlling at least one of a light intensity of the light beam and the rotating of the at least one reflective column to produce an adjustable light pattern transmitted at a scene; and
sensing reflections of the light pattern reflected from the scene and then transmitted back to the sensor by at least one facet of the at least one reflective column.

14. The method of claim 13, wherein the light beam comprises multiple beams.

15. The method of claim 14, wherein the multiple beams are generated using a diffractive optical element.

16. The method of claim 15, wherein the diffractive optical element is part of a facet of the plurality of facets.

17. The method of claim 13, wherein one or more facets of the plurality of facets have optical properties different from other facets of the plurality of facets, so that a pattern produced via the one or more facets is optically distinguishable from patterns produced via the other facets.

18. The method of claim 13, wherein each of the facets has different optical properties.

19. The method of claim 13, wherein controlling the light intensity of the light beam comprises adjusting the intensity of the light beam based on a predefined region of interest (ROI) of the scene.

* * * * *